United States Patent
Phillips et al.

(10) Patent No.: US 6,912,507 B1
(45) Date of Patent: Jun. 28, 2005

(54) METHOD AND APPARATUS FOR INTERACTIVE SHOPPING

(75) Inventors: W. Garland Phillips, Arlington, TX (US); Dwight R. Smith, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 896 days.

(21) Appl. No.: 09/634,609

(22) Filed: Aug. 5, 2000

(51) Int. Cl.$^7$ ............................................. G06F 17/60
(52) U.S. Cl. .............................. 705/26; 705/27; 705/22
(58) Field of Search ............................... 705/26, 27, 22

(56) References Cited

U.S. PATENT DOCUMENTS

| | | | | |
|---|---|---|---|---|
| 5,250,789 | A | | 10/1993 | Johnsen ........................ 705/14 |
| 5,390,107 | A | * | 2/1995 | Nelson et al. ................. 705/10 |
| 5,424,524 | A | * | 6/1995 | Ruppert et al. ................ 705/8 |
| 5,596,493 | A | * | 1/1997 | Tone et al. .................... 705/10 |
| 5,630,068 | A | * | 5/1997 | Vela et al. ..................... 705/1 |
| 5,758,328 | A | * | 5/1998 | Giovannoli ................... 705/26 |
| 5,848,399 | A | * | 12/1998 | Burke .......................... 705/27 |
| 5,859,414 | A | * | 1/1999 | Grimes et al. .............. 235/383 |
| 6,123,259 | A | * | 9/2000 | Ogasawara ................. 235/380 |
| 6,179,206 | B1 | * | 1/2001 | Matsumori ................. 235/383 |
| 6,539,393 | B1 | * | 3/2003 | Kabala ....................... 707/102 |
| 6,587,835 | B1 | * | 7/2003 | Treyz et al. .................. 705/14 |
| 2001/0027422 | A1 | * | 10/2001 | Brandrud ...................... 705/26 |
| 2001/0032130 | A1 | * | 10/2001 | Gabos et al. .................. 705/14 |
| 2002/0002504 | A1 | * | 1/2002 | Engel et al. ................... 705/26 |
| 2002/0056385 | A1 | * | 5/2002 | Timms et al. ................. 705/27 |
| 2002/0178088 | A1 | * | 11/2002 | Lurie et al. .................... 705/26 |
| 2003/0055707 | A1 | * | 3/2003 | Busche et al. ................ 705/10 |
| 2003/0154135 | A1 | * | 8/2003 | Covington et al. ........... 705/26 |

FOREIGN PATENT DOCUMENTS

| WO | WO-91/14984 A1 | * | 10/1991 |
|---|---|---|---|
| WO | WO-93/22731 A1 | * | 11/1993 |
| WO | WO-98/42239 A2 | * | 10/1998 |

OTHER PUBLICATIONS

Grace, T., "Sears, Roebuck Awards Major Deal to CompuAdd," Computer Reseller News, p. 8, Jan. 20, 1992.*
Nielsen, J., "Noncommand User Interface," Communications of the ACM, vol. 36, No. 4, pp. 82–99, Apr. 1993.*
Anon., "Sports Authority Announces Major Initiative to Increase Customer Service and Improve Inventory Productivity; Retailer Rolls out People–Planner Labor Management System to Schedule Employees to Customer Traffic, The" Business Wire, Nov. 27, 1995.*
Kahn, H., "Grocery Chains Woo Repeat Customers with 'Special Deals,'" San Jose Mercury News, Morning Final edition, p. 1E, Sep. 2, 1996.*
Davis, C.B., "Marketing & Retail," Business Horizons, vol. 41, No. 4, p. 2, Jul.–Aug., 1998.*
Harkavy, J.S., in "Letters," PC Magazine, vol. 21, No. 1, Feb. 23, 1999.*
Caldwell, R.W., "Data Capture Grows Wider—Small Computing Devices and Embedded Ssytems Can Feed LArge DAta Warehouses, Leading to Potentially Powerful Data Analysis," InformationWeek, p. 59, Jun. 14, 1999.*
Ohr, S., "Conference to Debate Its Use in 'Ad Hoc Networks,' Virtual Office—Broader Role Explored for Bluetooth Wirless Net," Electronic Engineering Times, p. 49, Aug. 23, 1999.*
Forseter, M., "Age of Choice, An," Drug Store News, vol. 22, No. 5, p. 47, Apr. 10, 2000.*

* cited by examiner

*Primary Examiner*—Nicholas D. Rosen
(74) *Attorney, Agent, or Firm*—R. Louis Breeden; Hisashi D. Watanabe

(57) ABSTRACT

A wireless client (100) maintains (302) a shopping list of items desired by a shopper, and then transmits (304) the shopping list to an in-store shopping system (200). The in-store shopping system receives (306) the shopping list and then generates information identifying where to find the items and further identifying where the wireless client is positioned in the store. The in-store shopping system communicates (308) the information to the wireless client, which then displays (310) the information to the shopper.

18 Claims, 5 Drawing Sheets

| ITEM | AISLE | MARKER |
|---|---|---|
| EGGS | 1 | T |
| LETTUCE | 2 | B |
| TOMATOES | 2 | F |
| SHAMPOO | 4 | M |
| BEEF RIB STEAK | 6 | A |
| ORANGE JUICE | 10 | Y |

FIG. 9

TOTAL LIST COMPARISON

| | |
|---|---|
| STORE A | $17.89 |
| STORE B | $18.56 |

FIG. 10

| ITEM | STORE A | STORE B | SAVE |
|---|---|---|---|
| EGGS | LOW | | $0.15 |
| LETTUCE | | LOW | $0.10 |
| TOMATOES | LOW | | $0.49 |
| SHAMPOO | LOW | | $0.34 |
| BEEF RIB STEAK | | LOW | $0.89 |
| ORANGE JUICE | LOW | | $0.23 |

FIG. 11

METHOD AND APPARATUS FOR INTERACTIVE SHOPPING

FIELD OF THE INVENTION

This invention relates in general to wireless communication systems, and more specifically to a method and apparatus for interactive shopping.

BACKGROUND OF THE INVENTION

Shopping in large stores can be inefficient and time consuming unless the shopper is very familiar with the store inventory and the location of desired items. Typically, the shopper will wander around retrieving items on a shopping list. An attempt may be made to shop aisle by aisle, but often things are missed and aisles are repeated. Also, aisles containing nothing on the shopping list may be traversed unnecessarily. Many large stores place signs at each aisle describing items which can be found there. The signs typically contain 8 to 10 items, while the aisle may contain hundreds of different items. It is assumed that "related" items will be found nearby. The definition of what is related is not standard or known by the shopper. In addition, the shopper is not always well informed about where to shop to obtain the lowest price for the desired items.

Thus, what is needed is a method and apparatus for interactive shopping. Preferably, the method and apparatus will orient the shopper as to the shopper's current position in a store and will guide the shopper directly to the desired items in an efficient manner. In addition, the method and apparatus will preferably aid the shopper in making price comparisons among different stores.

BRIEF DESCRIPTION OF THE DRAWINGS

FIG. 9 is an exemplary displayed shopping list with locations in accordance with an alternative embodiment of the present invention.

FIG. 10 is an exemplary first type of displayed price comparison in accordance with the present invention.

FIG. 11 is an exemplary second type of displayed price comparison in accordance with the present invention.

DETAILED DESCRIPTION OF THE DRAWINGS

Figure 1:
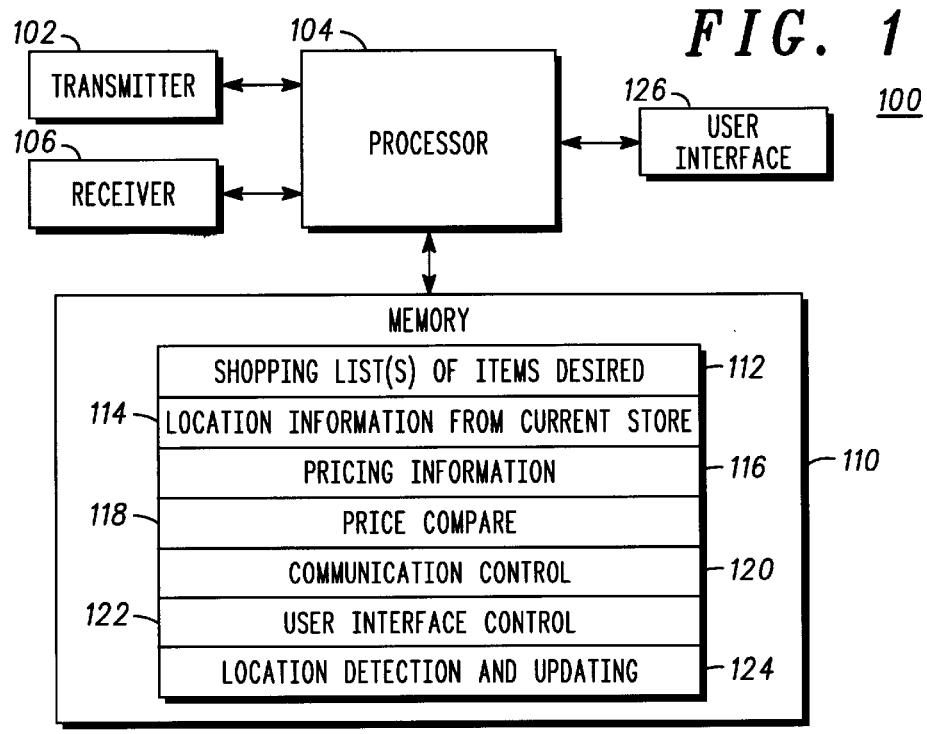
FIG. 1 is an exemplary electrical block diagram of a wireless client in accordance with the present invention.
Figure 2:
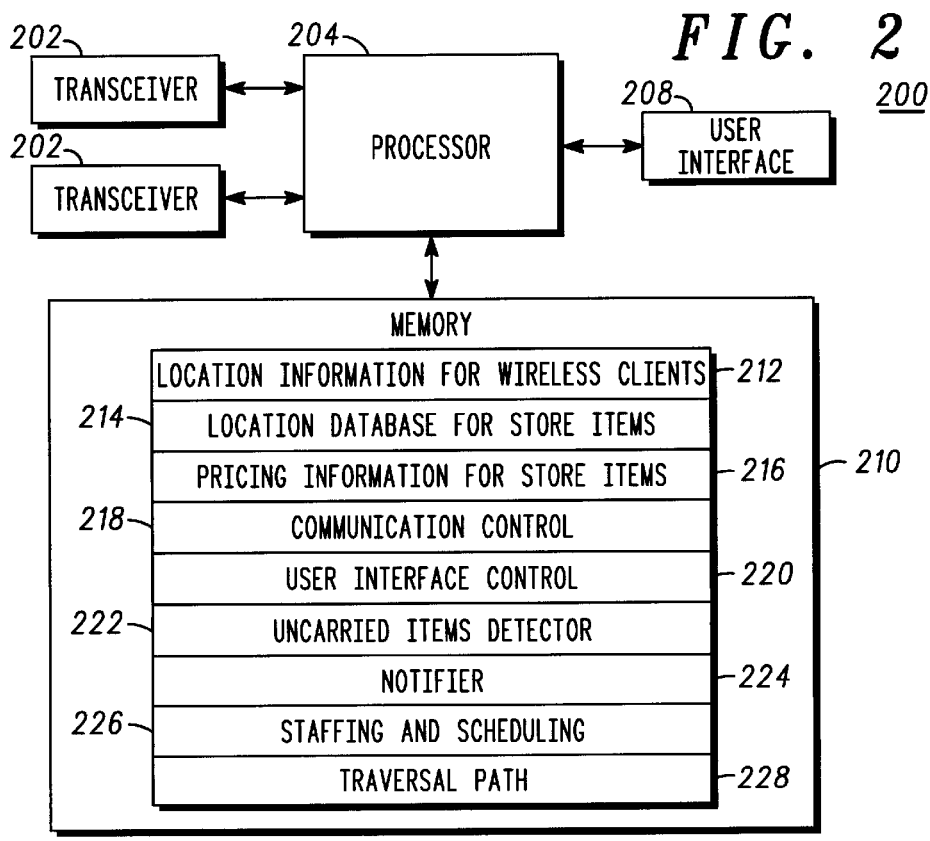
FIG. 2 is an exemplary electrical block diagram of an in-store shopping system in accordance with the present invention.

FIG. 1 is an exemplary electrical block diagram of a wireless client 100 in accordance with the present invention. The wireless client 100 comprises a conventional transmitter 102 for transmitting a shopping list of items desired by a shopper to an in-store shopping system 200 (FIG. 2). The transmitter 102 is coupled to a conventional processor 104 for processing the shopping list and for controlling the wireless client 100. The processor 104 is also coupled to a conventional receiver 106 for receiving information from the in-store shopping system 200, the information comprising pricing information and location information applicable to the shopping list. The processor 104 is also coupled to a conventional user interface 126, e.g., a liquid crystal display and keypad, or a touch-sensitive display, for allowing the shopper to interact with the wireless client 100 to maintain the shopping list.

The processor 104 is further coupled to a conventional memory 110 for storing one or more shopping lists 112, along with other information and software for programming the processor 104. (When multiple shopping lists, e.g., groceries, building materials, sporting goods, etc., exist in the wireless client 100, a list appropriate for a currently visited store preferably is selectively activated by the shopper through the user interface 126 of the wireless client 100.) In addition, the memory 110 includes location information 114 received from a currently visited in-store shopping system 200, as well as pricing information 116 from the currently visited in-store shopping system 200 and, preferably, also from earlier-visited in-store shopping systems 200. The memory 110 further comprises a price compare program 118 for programming the processor 104 to make price comparisons between stores. The memory 110 also includes a communication control program 120 for programming the processor 104 to process communications between the in-store shopping system 200 and the wireless client 100 in accordance with the present invention. In addition, the memory 110 includes a user interface control program 122 for programming the processor 104 to control the user interface 126 to present information to, and receive information from, the shopper. The memory 110 also includes a location detection and updating program 124 for programming the processor 104 to cooperate with the in-store shopping system 200 to determine and update the location of the wireless client 100 as the wireless client 100 moves about the store. It will be appreciated that, alternatively, the wireless client 100 can include a location detection device which operates independent of the in-store shopping system, e.g., receives a signal from a satellite to determine the location of the wireless client 100. Operation of the wireless client 100 is described further herein below.

FIG. 2 is an exemplary electrical block diagram of the in-store shopping system 200 in accordance with the present invention. The in-store shopping system 200 comprises a plurality of conventional transceivers 202 for transmitting and receiving data to and from the wireless client 100 including receiving the shopping list of items desired by the shopper and transmitting information identifying where to find the items. The in-store shopping system 200 further comprises a conventional processor 204 coupled to the plurality of transceivers 202 for processing the shopping list and the location coordinates to generate information identifying where to find the items. In addition, the in-store shopping system 200 includes a conventional user interface 208 coupled to the processor 204 for allowing a system operator to program and control the in-store shopping system 200.

The in-store shopping system 200 also includes a conventional memory 210 coupled to the processor 204 for storing additional information and software for programming the processor 204. The memory 210 comprises location information 212 for wireless clients 100 visiting the store. The location information 212 preferably includes for each wireless client 100 present in the store the position of the wireless client 100 relative to the store, and the locations of the items on the active shopping list 112 of the wireless client 100. The memory 210 further comprises a location database 214 comprising a description and a location identifier for each item stocked by the store. In one embodiment, the location database 214 includes information which, when communicated to the wireless client 100, allows the wireless client 100 to construct and display to the shopper a store diagram depicting the store's layout, e.g., aisles and display racks, and further depicting where the items on the active shopping list of the wireless client 100 are located. In addition, the memory 210 includes pricing information 216 for the items stocked by the store. The memory 210 also includes a communication control program 218 for programming the processor 204 to control the plurality of transceivers 202 to communicate with the wireless client 100 as necessary for performing in accordance with the present invention.

In one embodiment, the plurality of transceivers 202 create short range, e.g. 5 meter, coverage zones using a technology such as Bluetooth to transmit location information for the zone, so that the wireless client 100 can determine its approximate position in the store. In one embodiment, the wireless client 100 transmits the location information back to the in-store shopping system 200 so that the in-store shopping system can display the position of the wireless client 100 in the store to the shopper on the store diagram. It will be appreciated that, alternatively, the in-store shopping system 200 can determine the position of the wireless client 100 through other techniques, e.g., triangulation by multiple receivers, and beacon transmitters identifying each aisle and reported by the wireless client 100, to name two such other techniques.

The memory 210 further comprises a user interface control program 220 for programming the processor 204 to cooperate with the user interface 208 for providing programming and control of the in-store shopping system 200 by the system operator. The memory 210 also includes uncarried items detector program 222 to identify any of the items on the shopping list that are not carried by the store. The uncarried items detector program 222 preferably stores a description of each requested but uncarried item, along with a count of how many times the item has been requested, in the memory 210 so that the system operator can generate a report for consideration of adding the item to the store's regular stock. The memory 210 further comprises a notifier program 224 for programming the processor 204 to cooperate with the plurality of transceivers 202 to send to the wireless client 100 a notification when a requested product requiring preparation time has become available. For example, when the pharmacy has prepared a prescription, the in-store shopping system 200 notifies the appropriate wireless client 100, which alerts the shopper in response.

The memory 210 also includes a staffing and scheduling program 226 for programming the processor to periodically measure data selected from at least one of (a) how many wireless clients 100 are present and (b) their locations, and to predict staffing requirements for a checkout counter from the data. The staffing and scheduling program 226 preferably also programs the processor 204 to collect statistics on store traffic over time to better manage employee work schedules. In addition, the memory 210 includes a traversal path program 228 for programming the processor 204 to discover a historical traversal path of shoppers to plan advertising and item placement. This can be accomplished, for example, by programming the wireless client 100 to identify itself and report whenever it moves from one coverage area to a next. The in-store shopping system 200 records the reported zone changes, so that after some time, e.g., a month, the in-store shopping system 200 can estimate the historical traversal path of shoppers through the store. Such a path may, for example, comprise good locations for advertisements and high-profit impulse items.

Figure 3:
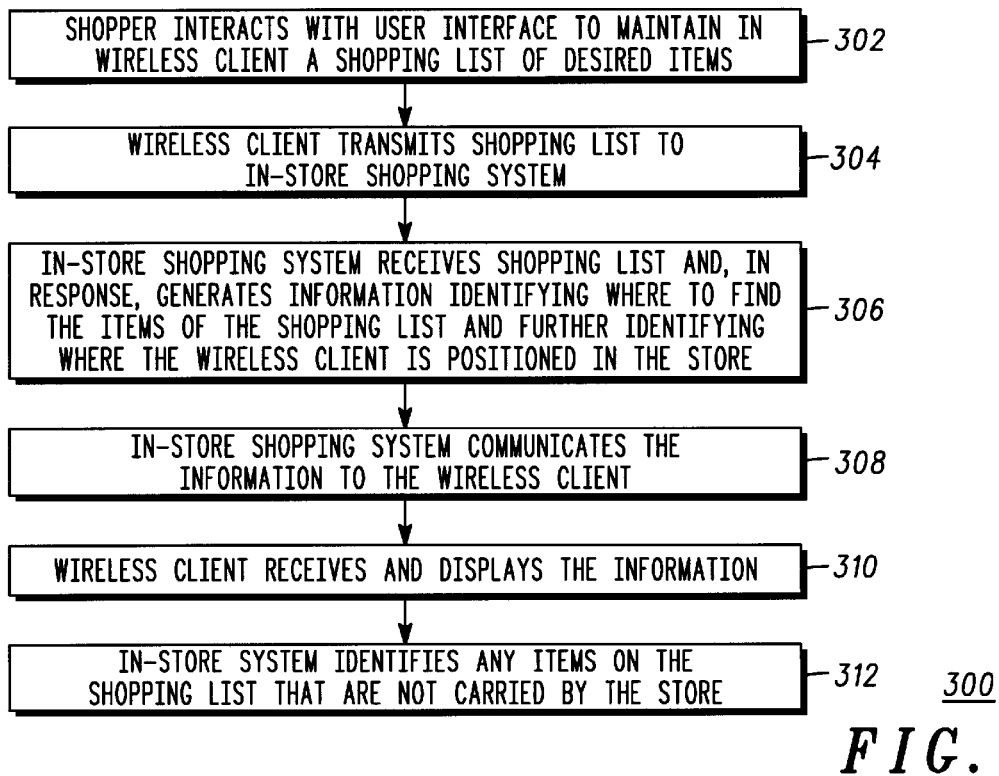
FIG. 3 is an exemplary flow chart depicting a first method of interactive shopping in accordance with the present invention.

FIG. 3 is an exemplary flow chart 300 depicting a first method of interactive shopping in accordance with the present invention. The flow chart 300 begins with the shopper interacting with the user interface 126 of the wireless client 100 to maintain 302 in the wireless client 100 the shopping list 112 of desired items. The wireless client 100 then transmits 304 the shopping list 112 to the in-store shopping system 200. The in-store shopping system 200 receives 306 the shopping list 112 and, in response, accesses the location database 214 to generate information identifying where to find the items of the shopping list 112 and further identifying where the wireless client 100 is positioned in the store. In one embodiment, the information includes a diagram of the store indicating where the wireless client 100 is positioned in the store. The in-store shopping system 200 communicates 308 the information to the wireless client 100, which receives and displays 310 the information. The in-store shopping system 200 then identifies 312 any items on the shopping list that were not found in the location database 214 and thus appear not to be carried by the store. The in-store shopping system 200 preferably stores the description of any such uncarried items in the memory 210 for subsequent retrieval by the system operator.

Figure 4:
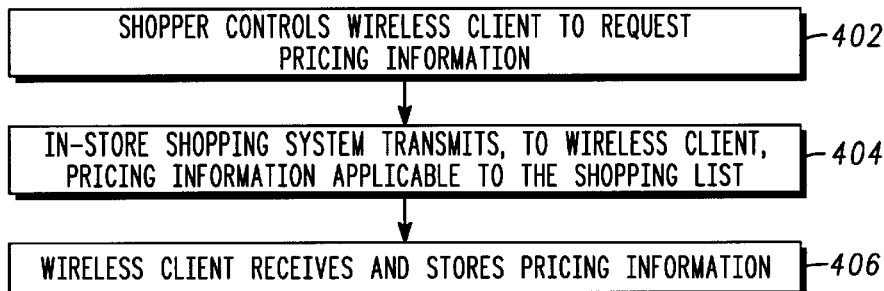
FIG. 4 is an exemplary flow chart depicting a second method of interactive shopping in accordance with the present invention.
Figure 4:
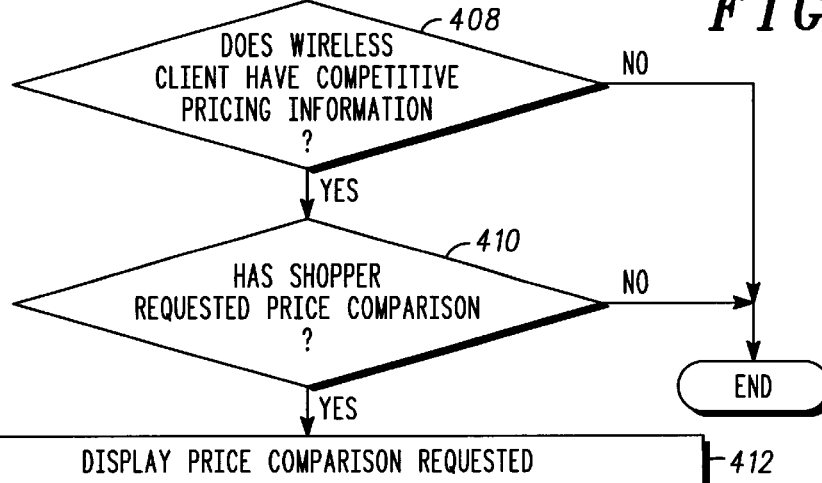

FIG. 4 is an exemplary flow chart 400 depicting a second method of interactive shopping in accordance with the present invention. The flow chart 400 begins with the shopper controlling 402 the wireless client 100 to request the pricing information 116 from the in-store shopping system 200. In response, the in-store shopping system 200 transmits 404, to the wireless client 100, the pricing information 116 applicable to the shopping list 112. It will be appreciated that, before transmitting the pricing information 116, the in-store shopping system 200 may need to request and receive additional information about the items on the shopping list 112 from the shopper. For example, before pricing eggs, the in-store shopping system 200 may heed to know the grade, size, and quantity desired; and before pricing tomatoes, the system 200 may for the shopper to select among several types of tomato carried by the store and to specify the quantity or weight desired.

The wireless client 100 next receives 406 and stores the pricing information 116. The wireless client 100 checks 408 whether it has competitive pricing information for the shopping list items stored in the memory 110. If not, the process ends. If competitive pricing information is available, the wireless client 100 checks 410 whether the shopper has requested a price comparison. If not the process ends, at least until the shopper does request a price comparison. If the shopper has requested a price comparison, the wireless client 100 displays 412 the type of price comparison requested by the shopper, as will be described further herein below.

Figure 5:
FIG. 5 is an exemplary flow chart depicting a third method of interactive shopping in accordance with the present invention.

FIG. 5 is an exemplary flow chart 500 depicting a third method of interactive shopping in accordance with the present invention. The flow chart 500 begins when a requested product (or service) has become available 502. In response, the in-store shopping system 200 sends 504 the wireless client 100 a notification that the product is now available and ready for pick-up.

Figure 6:
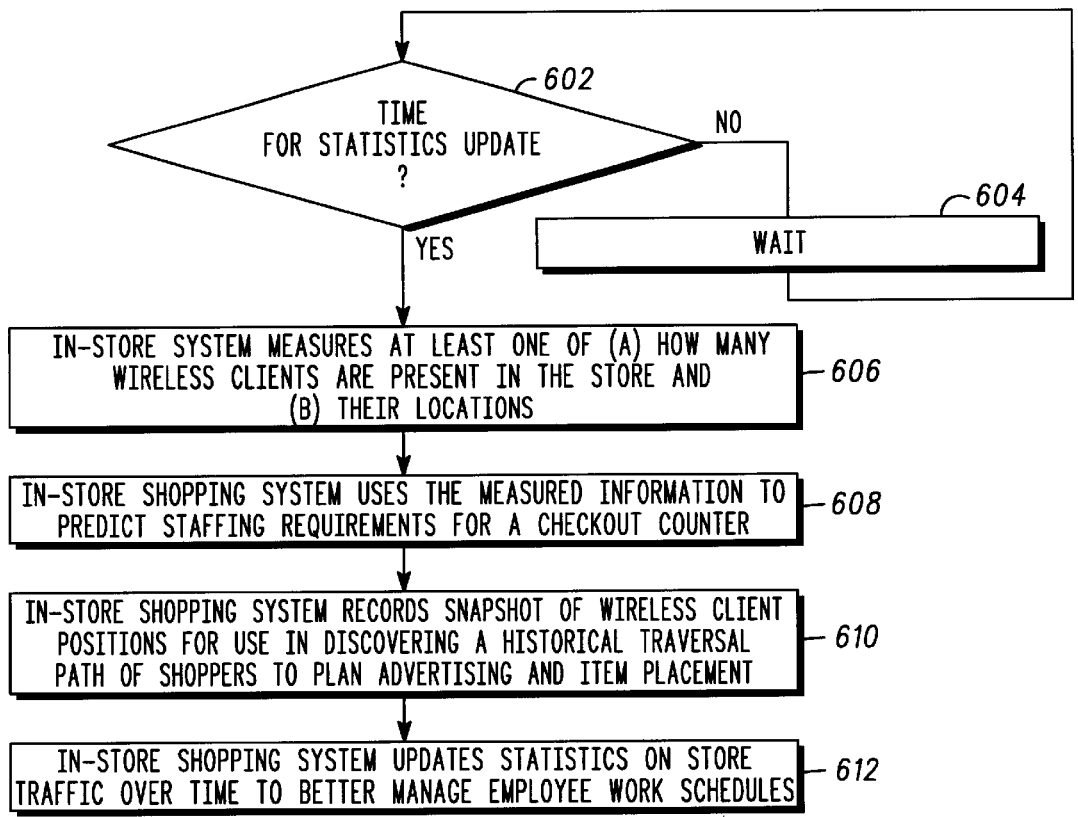
FIG. 6 is an exemplary flow chart depicting a fourth method of interactive shopping in accordance with the present invention.

FIG. 6 is an exemplary flow chart 600 depicting a fourth method of interactive shopping in accordance with the present invention. The flow chart 600 begins with the in-store shopping system 200 checking 602 whether it is time for a statistics update, which is preferably repeated at predetermined intervals. If not, the in-store shopping system 200 waits 604 a predetermined time and then repeats the check. When the time arrives for the statistics update, the in-store shopping system 200 measures 606 data selected from at least one of (a) how many wireless clients are present and (b) their locations. The in-store shopping system 200 then predicts 608 staffing requirements for a checkout counter from the data measured. For example, the wireless clients 100 preferably report their positions when entering new coverage zones, and the in-store shopping system 200 monitors the reports. The in-store system preferably compares the reported traffic with the number of checkout counters open and raises an alert when the load approaching the checkout counters is more than the desired quality of service will allow.

The in-store shopping system 200 next records 610 a snapshot of wireless client positions for use in discovering the historical traversal path of shoppers to plan, for example, advertising and item placement. The in-store shopping system 200 then updates 612 statistics on store traffic over time to better manage employee work schedules. For example, the in-store shopping system 200 can record the number of wireless clients 100 present in the store every thirty minutes, along with the time and date.

Figure 7:
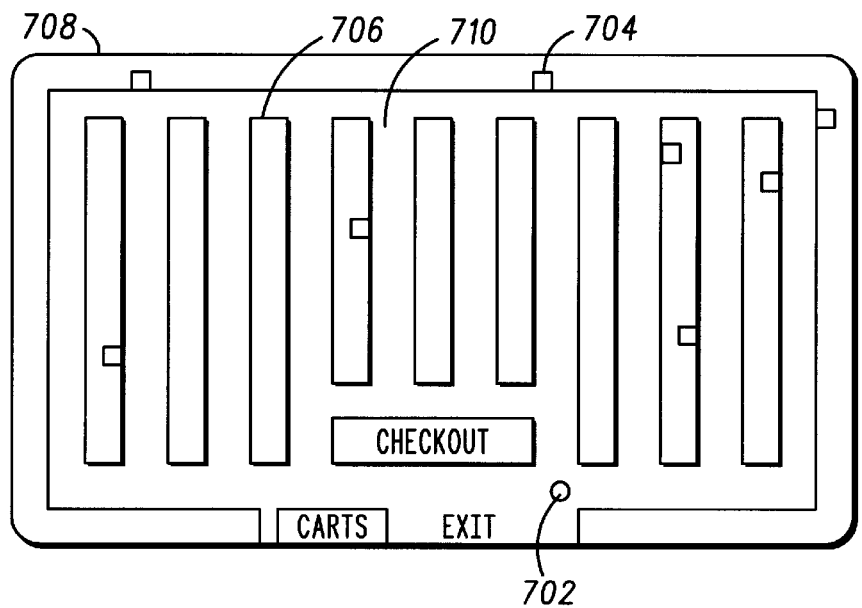
FIG. 7 is an exemplary displayed store diagram in accordance with the present invention.

FIG. 7 is an exemplary displayed store diagram 700 in accordance with the present invention. The diagram 700 is preferably displayed on a display 708 of the user interface 126 of the wireless client 100. The diagram 700 preferably depicts the aisles 710 and display racks 706 of the store. The current position of the wireless client 100 is depicted, e.g., by a black circle 702, and the locations of items on the shopping list are also depicted, e.g., by black squares 704.

Figure 8:
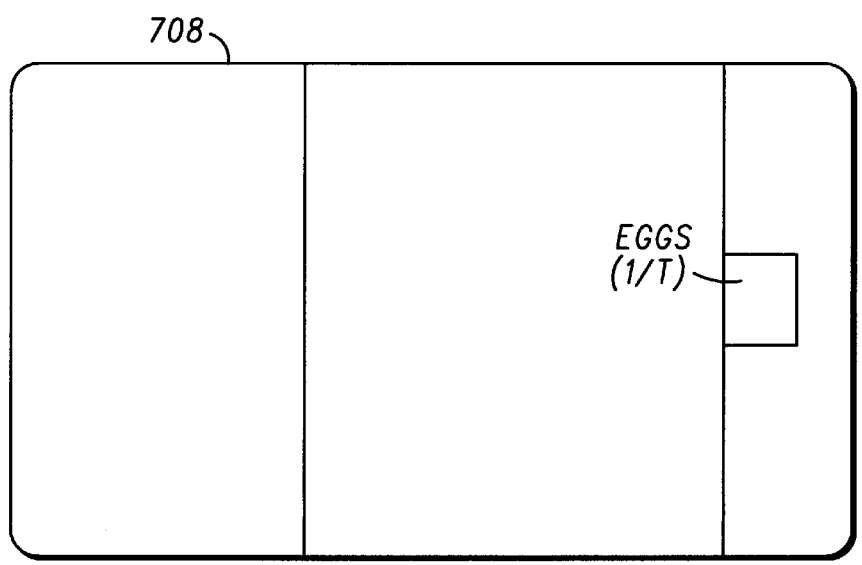
FIG. 8 is an exemplary zoomed-in displayed store diagram in accordance with the present invention.

FIG. 8 is an exemplary zoomed-in displayed store diagram 800 in accordance with the present invention. The shopper can zoom in (enlarge) a selected area of the store diagram to see more detailed information. This preferably is accomplished through the user interface 126 using well-known techniques; e.g., position cursor in selected area and then press "zoom" button. Note that in the example store diagram 800 the item EGGS and aisle/marker (1/T) are identified.

FIG. 9 is an exemplary displayed shopping list 900 with locations in accordance with an alternative embodiment of the present invention. In this embodiment, the items of the shopping list are displayed on the display 708, along with the aisle number and the marker number. The items are preferably sorted in an order that provides efficient traversal of the store, e.g., aisle and marker number in ascending order. Note that a highlight bar 902 advantageously appears at an item whenever the in-store system detects that the wireless client 100 is proximate the location of the item.

FIG. 10 is an exemplary first type of displayed price comparison 1000 in accordance with the present invention. The shopper preferably initiates the price comparison 1000 through a command entered via the user interface 126. This first type of price comparison displays the total price if the entire shopping list of items were to be purchased in each store. This type of price comparison is advantageous when the shopper does not want to take the time to shop in several different stores to obtain the very best price for each item, but wants to opt for the store with the lowest total price for the whole shopping list.

FIG. 11 is an exemplary second type of displayed price comparison 1100 in accordance with the present invention. This second type of price comparison indicates (LOW) the store having the low price for each item on the shopping list. The comparison also lists the savings achieved by purchasing the item at the indicated store. This advantageously allows the shopper to obtain the very best price of any of the stores surveyed, when the shopper is willing to visit several different stores. For convenience, the wireless client 100 preferably provides a predetermined command that can be entered by the shopper to cause the wireless client 100 to split the shopping list into first and second shopping lists, the first shopping list including only the items for which store A has the low price, the second shopping list including only the items for which store B has the low price. That way, when the shopper is in store A, only the locations of items for which store A has the low prices will be displayed on the store diagram 700; and when the shopper is in store B, only the locations of items for which store B has the low prices will be displayed on the store diagram 700. It will be appreciated that the price comparisons can be expanded to compare the prices of more than two stores.

It should be clear from the preceding disclosure that the present invention provides a method and apparatus for interactive shopping. Advantageously, the method and apparatus orients the shopper as to the shopper's current position in a store and guides the shopper directly to the desired items in an efficient manner. In addition, the method and apparatus advantageously aids the shopper in making price comparisons among different stores.

Many modifications and variations of the present invention are possible in light of the above teachings. For example, the location and price comparison information can be displayed in many different formats other than those of the examples presented. Thus, it is to be understood that, within the scope of the appended claims, the invention can be practiced other than as specifically described herein above.

What is claimed is:

1. A method of interactive shopping at a store, comprising in a wireless client of one or more wireless clients the steps of:

maintaining a shopping list of items desired by a shopper;
   transmitting the shopping list to an in-store shopping system;
   receiving information from the in-store shopping system, the information identifying where to find the items and further identifying where the wireless client is positioned in the store; and
   displaying said information;

the method further comprising in the in-store shopping system the steps of:

receiving the shopping list;
   generating said information;
   communicating said in formation to the wireless client;
   measuring data selected from at least one of (a) how many wireless clients of said one or more wireless clients of said one or more wireless clients are present and (b) their locations; and
   predicting staffing requirements for a checkout counter from said data.

2. The method of claim 1, further comprising in the in-store shopping system the step of identifying any of the items on the shopping list that are not carried by the store.

3. The method of claim 1, further comprising in the in-store shopping system the step of sending to the wireless client a notification when a requested product requiring preparation time has become available.

4. The method of claim 1, further comprising in the in-store shopping system the step of discovering a historical traversal path of shoppers.

5. The method of claim 1, further comprising in the in-store shopping system the step of collecting statistics on store traffic over time to better manage employee work schedules.

6. The method of claim 1,
further comprising in the in-store shopping system the step of transmitting, to the wireless client, pricing information applicable to the shopping list; and
further comprising in the wireless client the step of storing the pricing information.

7. The method of claim 1, further comprising in the wireless client the steps of:
storing pricing information applicable to the shopping list, the pricing information received from first and second stores; and
providing a price comparison between the first and second stores.

8. The method of claim 1,
wherein said information includes a diagram of the store indicating where the wireless client is positioned in the store, and
wherein the displaying step comprises the step of displaying said diagram.

9. An in-store shopping system at a store, comprising;
a transceiver configured to receive from a wireless client of one or more wireless clients a shopping list of items desired by a shopper;
a processor coupled to the transceiver configured to process the shopping list to generate information identifying where to find the items and further identifying where the wireless client is positioned in the store;
a display coupled to the processor configured to display said information; and
wherein the processor is programmed to cooperate with the transceiver to transmit the information to the wireless client, measure data selected from at least one of (a) how many wireless clients of said one or more wireless clients are present are present and (b) their locations, and predict staffing requirements for a checkout counter from said data.

10. The in-store shopping system of claim 9, wherein the processor is further programmed to identify any of the items on the shopping list that are not carried by the store.

11. The in-store shopping system of claim 9, wherein the processor is further programmed to cooperate with the transceiver to send to the wireless client a notification when a requested product requiring preparation time has become available.

12. The in-store shopping system of claim 9, wherein the processor is further programmed to discover a historical traversal path of shoppers to plan advertising and item placement.

13. The in-store shopping system of claim 9 wherein the processor is further programmed to include in said information a diagram of the store indicating where the wireless client is positioned in the store, as well as where to find the items on the shopping list.

14. The in-store shopping system of claim 9, wherein the processor is further programmed to collect statistics on store traffic over time to better manage employee work schedules.

15. A wireless client for performing interactive shopping at first and second stores, the wireless client comprising:
a user interface for maintaining a shopping list of items desired by a shopper;
a processor coupled to the user interface for processing the shopping list;
a transmitter coupled to the processor for transmitting the shopping list to first and second in-store shopping systems at the first and second stores; and
a receiver coupled to the processor for receiving information from the first and second in-store shopping systems, said information comprising pricing information applicable to the shopping list,
wherein the processor is programmed to:
store the pricing information;
provide on the user interface a price comparison between the first and second stores;
determine for each of the items on the shopping list which of the first and second stores has a lower price;
cooperate with the user interface to receive a predetermined command; and
in response to the predetermined command, split the shopping list into first and second shopping lists, the first shopping list including only the items for which the first store has the lower price, the second shopping list including only the items for which the second store has the lower price.

16. The wireless client of claim 15, wherein the processor is further programmed to determine for each of the first and second stores a total price for all the item's on the shopping list.

17. The wireless client of claim 15, wherein the processor is further programmed to:
cooperate with the transmitter to send location information to an in-store shopping system of a currently visited store; and
cooperate with the receiver to receive from the in-store shopping system a diagram of the currently visited store indicating where the wireless client is positioned in the store.

18. The wireless client of claim 17, wherein the processor is further programmed to cooperate with the user interface to display said diagram.

* * * * *

UNITED STATES PATENT AND TRADEMARK OFFICE
CERTIFICATE OF CORRECTION

PATENT NO. : 6,912,507 B1
DATED : June 28, 2005
INVENTOR(S) : Phillips, W. Garland et al.

It is certified that error appears in the above-identified patent and that said Letters Patent is hereby corrected as shown below:

Column 6,
Line 56, delete "in formation" and add -- information --.

Column 7,
Line 31, delete "are present".

Signed and Sealed this

Twenty-seventh Day of September, 2005

JON W. DUDAS
*Director of the United States Patent and Trademark Office*